(12) United States Patent
Roberts

(10) Patent No.: US 6,415,498 B1
(45) Date of Patent: Jul. 9, 2002

(54) PROCESS FOR MAKING PIN-TYPE SYNCHRONIZERS

(75) Inventor: Keith Roberts, South Wales (GB)

(73) Assignee: BorgWarner, Inc., Troy, MI (US)

( * ) Notice: Subject to any disclaimer, the term of this patent is extended or adjusted under 35 U.S.C. 154(b) by 21 days.

(21) Appl. No.: 09/243,092

(22) Filed: Feb. 2, 1999

(51) Int. Cl.[7] .................... B23P 13/04; F16D 11/04

(52) U.S. Cl. ............... 29/557; 72/340; 72/334; 192/53.33; 192/53.331; 192/53.332

(58) Field of Search .................... 29/557; 72/334, 72/335, 336, 340; 192/53.33, 53.331, 53.322

(56) References Cited

U.S. PATENT DOCUMENTS

| | | | | | |
|---|---|---|---|---|---|
| 2,397,344 A | * | 3/1946 | Fishburn | .................. | 192/53.33 |
| 3,858,427 A | * | 1/1975 | Euteneuer et al. | ............ | 72/334 |
| 4,830,159 A | * | 5/1989 | Johnson et al. | ................ | 192/53 |
| 5,069,079 A | * | 12/1991 | Vandervoort | ................. | 192/53 |
| 5,641,044 A | * | 6/1997 | Morscheck | ........... | 192/53.331 |
| 5,706,694 A | * | 1/1998 | Bhookmohan et al. | | |
| 5,881,593 A | * | 3/1999 | Bulso, Jr. et al. | ............. | 72/336 |

* cited by examiner

Primary Examiner—S. Thomas Hughes
Assistant Examiner—Eric Compton
(74) Attorney, Agent, or Firm—Artz & Artz, P.C.; Greg Dziegielewski

(57) ABSTRACT

A pin-type synchronizer core formed from a flat piece of steel material. An annular disc is formed into a core member with a U-shaped channel and pockets.

5 Claims, 2 Drawing Sheets

PROCESS FOR MAKING PIN-TYPE SYNCHRONIZERS

TECHNICAL FIELD

The present invention relates to the manufacture of pin-type synchronizers for transmissions.

BACKGROUND ART

There are many types and varieties of synchronizer mechanisms known today for vehicle transmissions. One of these types is called a "pin-type" synchronizer mechanism which utilizes an annular core machined from a piece of metal material. Machining the core is an expensive labor-intensive process, however, which creates additional waste, cost and effort to produce. Also, significant use of energy is needed to remove surplus material from the workpiece.

Many efforts are made today to reduce the cost of vehicles and their components, as well as to reduce their weight, thus making the vehicles more cost effective and fuel efficient. Fuel efficiency in particular has benefits both to the customer in terms of fuel cost savings, as the manufacturer in terms of meeting the mileage efficiency standards.

SUMMARY OF THE INVENTION

It is an object of the present invention to provide an improved transmission system for a vehicle. It is also an object of the present invention to provide an improved synchronizer system for a transmission.

It is a further object of the present invention to provide a synchronizer mechanism which is lighter in weight than known synchronizer mechanisms and can be produced on a more cost effective basis. It is another object of the present invention to provide a low weight, low cost pin-type synchronizer device.

It is a still further object of the present invention to provide a synchronizer core which can be stamped from a mild steel material, rather than being machined from solid bar stock or more expensive brass-type materials.

These and other objects are met by the present invention which comprises a process for producing a pin-type synchronizer member by forming an annular disc from a piece of flat steel material, turning up the outer circular edge to form a disc-shaped member, and turning up the circular inner edge to form a U-shaped annular member. Preferably a sharp edge is also formed on the outer edge and a plurality of pockets and holes are formed in the U-shaped member.

DESCRIPTION OF THE PREFERRED EMBODIMENT(S)

Figure 1:
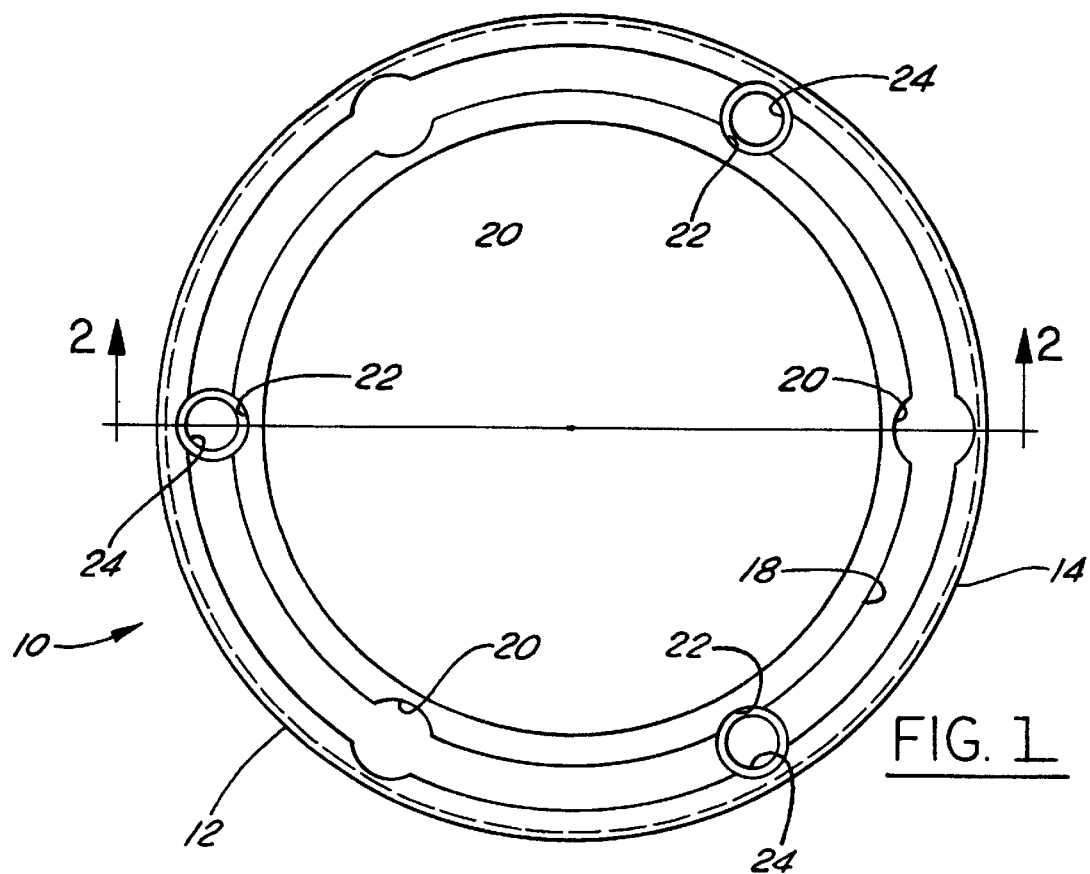
FIG. 1 illustrates a pin-type synchronizer core in accordance with the present invention.

In accordance with the present invention, an improved pin-type synchronizer core is provided. The core is referred to by the reference numeral 10 in the drawings.

Figure 2:
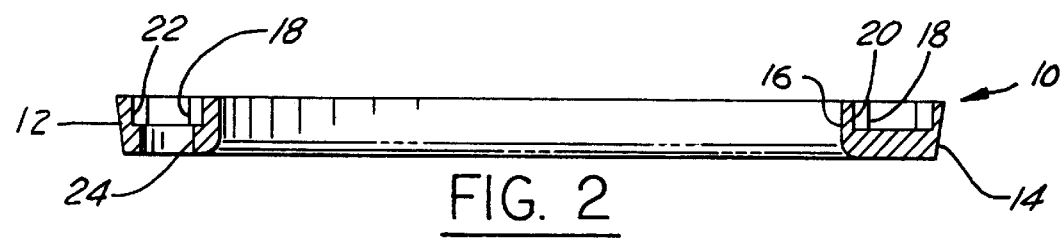
FIG. 2 is a cross-section of the invention as set forth in FIG. 1, the cross section being taken along lines 2—2 in FIG. 1 and in the direction of the arrows.

As shown in FIGS. 1 and 2, the core 10 comprises an annular U-shaped member 12 having an outer circular wall surface 14 and an inner circular wall opening 16. A generally U-shaped channel 18 is provided in the member 12 around its entire circumference. A plurality of openings 20 and 22 are provided in the member 12, three of the openings 20 forming a circular recess or pocket in the member, while openings or pockets 22 have holes or apertures 24 which extend through the member 12.

The use of the pin-type synchronizer core member 12 with openings 20 and 22 is commonly known to persons of ordinary skill in the art and does not need to be described further herein.

In accordance with the present invention, the member 12 is made from a blank of mild steel material. At the present time, pin-type synchronizer cores similar to those shown in FIGS. 1 and 2, are machine formed from a piece of metal or steel material by an expensive and time-consuming machining process.

In accordance with the present invention, the member 12 is fabricated from a piece of flat coil metal material, particularly a mild steel material. The member 12 is stamped from a progressive die, rather than being machined from a solid piece of metal material.

Figure 3A:
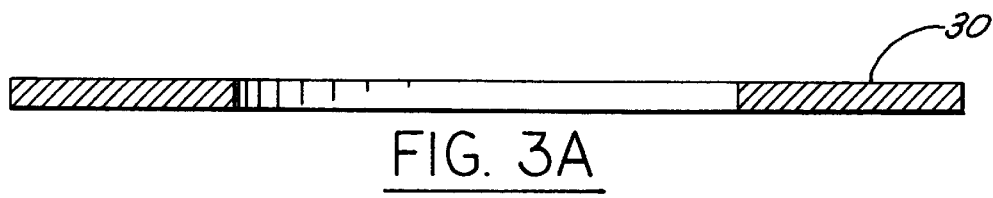
FIGS. 3A–3E illustrate steps in the manufacture of the present invention.
Figure 3B:
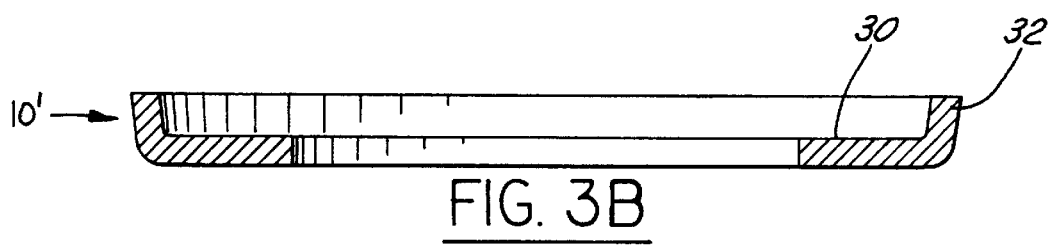

Initially, the piece of flat coil steel is cut into flat circular discs 30, as shown in FIG. 3A. Thereafter, as a first step in the progressive die forming operation, the outer edges 32 are raised or lifted up as shown in FIG. 3B. This forms a disc-shaped member 10' as shown.

Figure 3C:
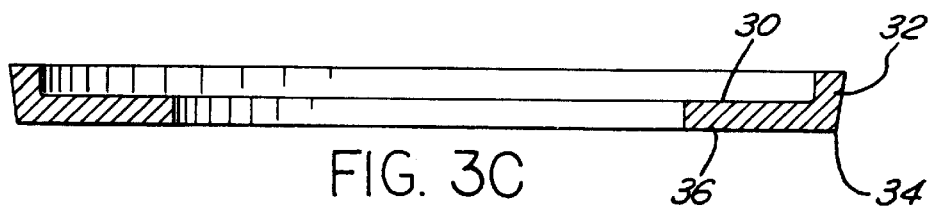
Figure 3D:
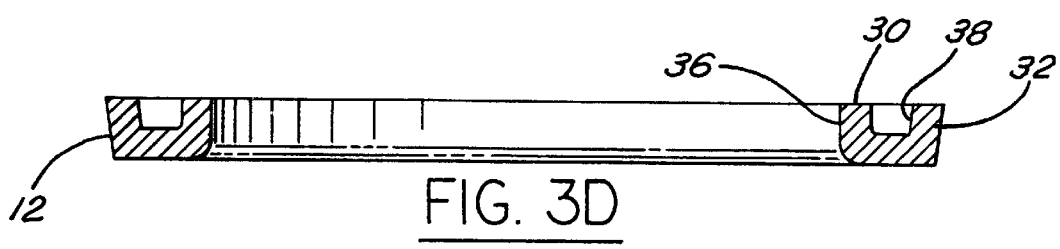
Figure 3E:
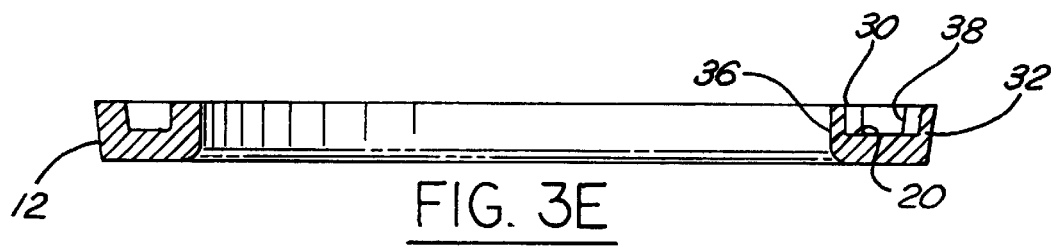
Figure 4:
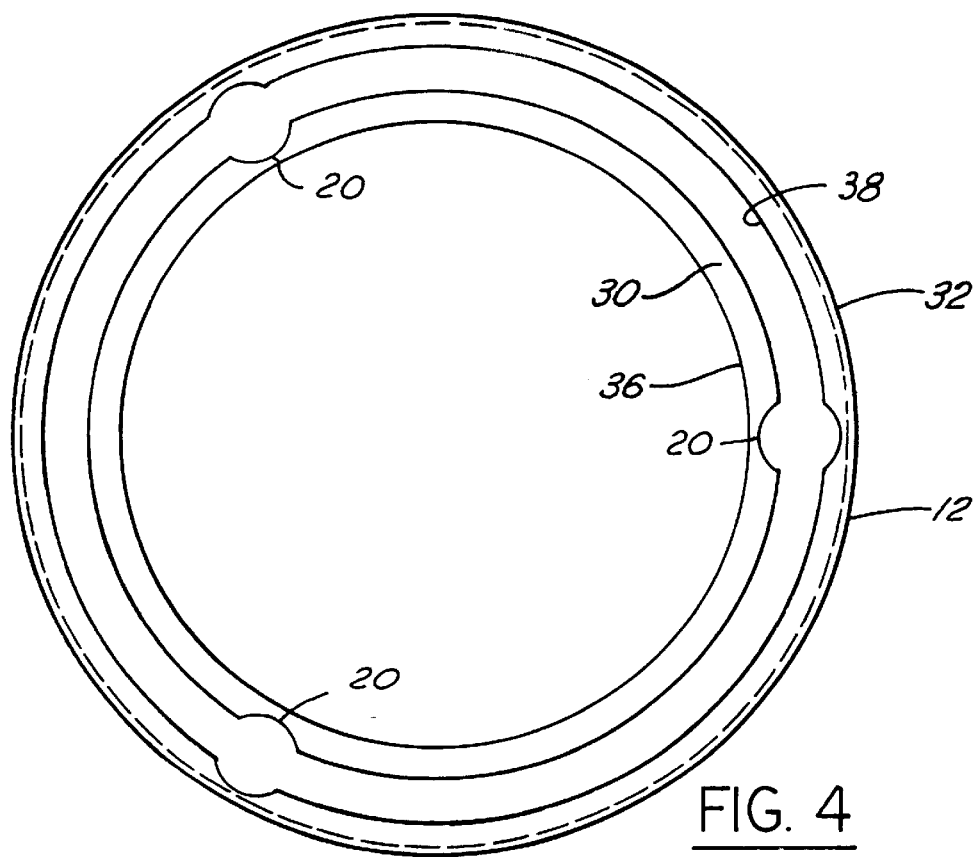
FIG. 4 is a top elevational view of the manufactured product as shown in FIG. 3E.

As the next step, the outer edges 34 of the blank or disc 30 are formed into sharp edges, as shown in FIG. 3C. Thereafter, in the next stage of the progressive die, the inner edges 36 of the blank or disc 30 are formed and formed in a similar manner as the outer edges 32. This creates internal U-shaped channel 38, as shown in FIG. 3D. As the last step in the progressive die process, the shape of the member 12 as shown in FIG. 3D is set by being stamped in the same size and shape as that formed in the progressive die step shown as FIG. 3D. The final holding step is shown in FIG. 3E. Three pockets 20 are also formed at this stage.

Thereafter, the pockets 22 are formed by a standard machining operation, and the holes 24 are formed in pockets 22. Preferably, the holes 24 are pierced through the pockets 22. However, the holes can be drilled or reamed.

Preferably, members 12 are blanked formed and pierced in a blanking press. Interchangeable working inserts can be used to reduce the cost for the manufacture of different sizes of pin-type synchronizer cores.

With the present invention, a pin-type synchronizer core can be formed in a less costly manner and with less waste of material. The member 12 is lighter in weight and less in cost than known synchronizer core members.

Not only is the process simpler for forming the Applicant's invention, but since less power is used, it has a positive environmental impact.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A process for making a pin-type synchronizer member comprising:

forming an annular disc from a piece of flat steel material, said disc having an outer circular edge and an inner circular edge;

turning up said outer circular edge to form a disc-shaped member having an outer annular member extending generally in an axial direction from a radially extending annular body member;

turning up said inner circular edge to form an inner annular wall member and a U-shaped annular member, said inner annular wall member extending generally in the same axial direction as said outer annular wall member; and forming a plurality of openings and pockets in said body member.

2. The process as set forth in claim 1 further comprising the step of forming a sharp edge on said outer circular edge, wherein the outer diameter of said annular member is produced at a prespecified synchronizing angle.

3. The process as set forth in claim 1 further comprising the step of setting the final shape of the U-shaped annular member after it is formed.

4. The process as set forth in claim 1 wherein the step of forming a plurality of openings in said body member further comprises the step of forming recesses in said inner and outer annular wall members adjacent said openings.

5. The process as set forth in claim 1 further comprising the step of forming three pockets and three openings.

* * * * *